(12) United States Patent
Subramaniam

(10) Patent No.: US 7,779,133 B2
(45) Date of Patent: Aug. 17, 2010

(54) ESTIMATION OF WEB CLIENT RESPONSE TIME

(75) Inventor: Subbu Subramaniam, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 478 days.

(21) Appl. No.: 11/619,849

(22) Filed: Jan. 4, 2007

(65) Prior Publication Data

US 2008/0168177 A1 Jul. 10, 2008

(51) Int. Cl.
*G06F 15/16* (2006.01)

(52) U.S. Cl. .................. 709/227; 709/228; 709/237

(58) Field of Classification Search ................ 709/231, 709/227, 228, 237, 249; 370/431, 433; 710/105
See application file for complete search history.

(56) References Cited

U.S. PATENT DOCUMENTS

| | | | | |
|---|---|---|---|---|
| 5,812,528 | A * | 9/1998 | VanDervort | 370/235 |
| 6,041,342 | A * | 3/2000 | Yamaguchi | 709/202 |
| 6,393,480 | B1 * | 5/2002 | Qin et al. | 709/224 |
| 7,024,490 | B2 * | 4/2006 | Hata et al. | 709/247 |
| 7,039,919 | B1 * | 5/2006 | Hunt | 719/316 |
| 7,222,189 | B1 * | 5/2007 | Nelken | 709/238 |
| 7,269,157 | B2 * | 9/2007 | Klinker et al. | 370/351 |
| 7,275,106 | B1 * | 9/2007 | Bean et al. | 709/227 |
| 7,363,367 | B2 * | 4/2008 | Lloyd et al. | 709/224 |
| 2002/0110091 | A1 * | 8/2002 | Rosborough et al. | 370/252 |
| 2002/0120727 | A1 * | 8/2002 | Curley et al. | 709/223 |
| 2002/0129161 | A1 * | 9/2002 | Lloyd et al. | 709/238 |
| 2002/0167942 | A1 * | 11/2002 | Fulton | 370/352 |
| 2002/0188648 | A1 * | 12/2002 | Aweya et al. | 709/102 |
| 2003/0204603 | A1 * | 10/2003 | Buchanan et al. | 709/228 |
| 2004/0049596 | A1 * | 3/2004 | Schuehler et al. | 709/238 |
| 2006/0168240 | A1 * | 7/2006 | Olshefski | 709/227 |
| 2007/0297410 | A1 * | 12/2007 | Yoon et al. | 370/392 |

OTHER PUBLICATIONS

V. Jacobson; RFC: 1323; TCP Extensions for High Performance; pp. 1-38; May 1992.*
RFC:793; Transmission Control Protocol; Sep. 1981.*
Tsang et al.; Network Radar: Tomography from Round Trip Time Measurements; Oct. 2004; ACM; pp. 175-180.*
Veal et all; New Methods for Passive Estimation of TCP Round-Trip Times; 2005; Springer-Verlag Berlin Heidelberg 2005; pp. 121-134.*
He et al.; Analysis of the 802.11i 4-Way Handshake; 2004; ACM; pp. 43-50.*

* cited by examiner

*Primary Examiner*—Rupal D Dharia
*Assistant Examiner*—Jimmy H Tran
(74) *Attorney, Agent, or Firm*—Baker Botts L.L.P.

(57) ABSTRACT

Apparatuses, methods, and systems directed to estimating response time and other performance metrics in network communications. Some embodiments of the invention allow users to monitor and estimate response time in real time. In other particular embodiments, the systems disclosed below can be used to estimate response time using server logs. In some embodiments, the present invention involves using open control blocks as a proxy to estimate the number of dropped connections.

18 Claims, 4 Drawing Sheets

ESTIMATION OF WEB CLIENT RESPONSE TIME

TECHNICAL FIELD

The present disclosure relates to estimation of response times, and other performance metrics, in computer network communications.

BACKGROUND

Several important computer technologies rely, to a great extent, upon rapid delivery of information from a central storage location to remote devices. For example, in the client/server model of computing, one or more servers are used to store information. Client computers or processes are separated from the servers and are connected to the servers using a network. The clients request information from one of the servers by providing a network address of the information. The server locates the information and transmits it over the network to the client, completing the transaction.

The World Wide Web is a popular application of the client/server computing model. A client, such as a computer or a software process such as a browser program, is connected to a global information network called the Internet, either directly or through an intermediary such as an Internet Service Provider, or an online information service. A server is likewise connected to the Internet. The client and server communicate using one or more agreed-upon protocols that specify the format of the information that is communicated. The most widely used protocol for the World Wide Web is the Transmission Control Protocol (TCP). It is a virtual circuit protocol that is one of the core protocols of the Internet protocol suite, often simply referred to as TCP/IP. Using TCP, applications on networked hosts can create connections to one another, over which they can exchange streams of data. The protocol guarantees reliable and in-order delivery of data from sender to receiver.

The server has a server name in an agreed-upon format that is indexed at a Domain Name Server (DNS). The client looks up the name of the server at the DNS and establishes a connection to the server using a communication protocol called the Hypertext Transfer Protocol (HTTP). A Uniform Resource Locator (URL) uniquely identifies each page of information stored on the server. A URL is a form of network address that identifies the location of information stored in a network. The logical path that connects a client to a server is called a connection. In practice, a connection is a set of data values that identify a hardware port, buffers, and storage areas that are dedicated to a particular path between client and server.

When buffered data communications is used, fast member mechanisms called buffers are interposed between the connections and the computer system. The connections fill the buffers with data at a rate proportional to the communication speed of the connection. Ideally, the system removes data from the buffers at the identical rate at which the buffers are filled. However, sometimes the buffers on the servers may be full due to a large number of client connections and a vast amount of data that needs to be communicated. As a result, clients might experience slow or dropped connections. The servers might have little knowledge that connections are being dropped since all the buffers are full and the data is not reaching the servers even after repeated attempts to resend the data by the clients.

In these and other contexts, a key factor that limits the performance of network communications among devices is the efficiency with which a central server can communicate with information to a client. In a networked environment, it is common for many clients to connect to one or more servers. For example, at Yahoo!, hundreds of thousands of servers provide services to hundreds of millions of clients over the Internet. To ensure quality of services, service providers need to monitor and estimate the response time for clients for trouble shooting and server capacity planning. However, due to the large number of clients and servers, monitoring and estimation response time, especially relative to or as observed by clients, are challenging tasks.

SUMMARY

The present invention provides apparatuses, methods, and systems directed to estimating response time and other performance metrics in network communications. Some embodiments of the invention allow users to monitor and estimate response time in real time. In other particular embodiments, the systems disclosed below can be used to estimate response time using server logs. In some embodiments, the present invention involves using open control blocks as a proxy to estimate the number of dropped connections.

In one embodiment of the present invention, the apparatuses and methods are directed to applying a filter while capturing TCP data packets from the machine's network interface as they are sent or received. In some embodiments, the filters are applied at the network interface level. Therefore, the more restrictive the filter, the lower the loss in terms of getting all the interested packets.

In other embodiments of the present invention, the apparatuses, methods, and systems involve processing the server logs to analyze and estimate the response time. In some embodiments, filters are applied while processing the server logs to identify slow or dropped connections.

The following detailed description together with the accompanying drawings will provide a better understanding of the nature and advantages of the various embodiments of the present invention.

DESCRIPTION OF EXAMPLE EMBODIMENT(S)

The following example embodiments and their aspects are described and illustrated in conjunction with apparatuses, methods, and systems which are meant to be illustrative examples, not limiting in scope.

A. Network Implementation

Figure 1:
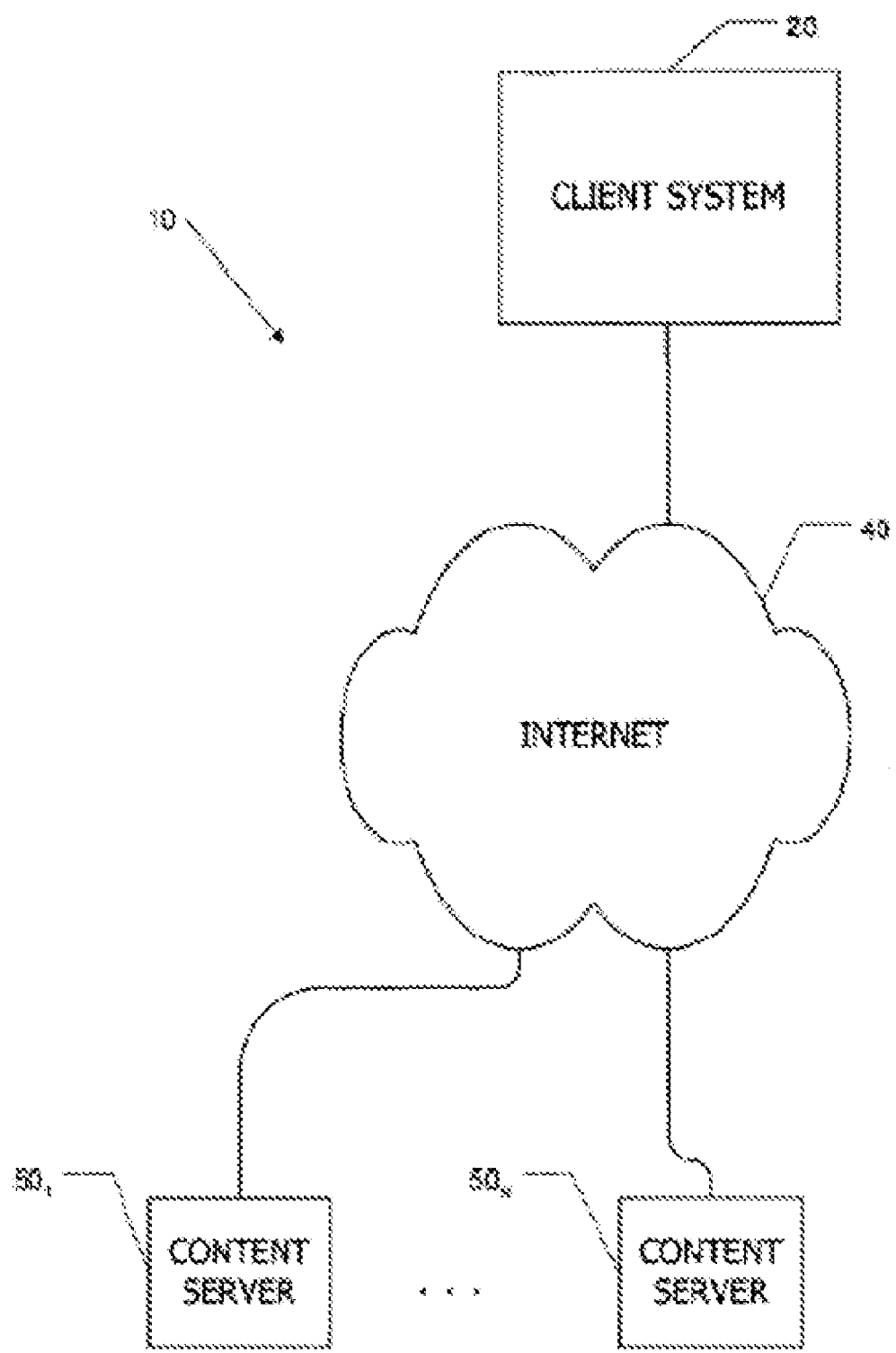
FIG. 1 is a diagram showing an example communication network, which network might be used with an embodiment of the present invention.

FIG. 1 illustrates a general overview of a communication network 10 including a client system 20 according to one particular embodiment of the present invention. In computer network 10, client system 20 is coupled through the Internet 40, or other communication network, e.g., over any local area network (LAN) or wide area network (WAN) connection, to any number of content server systems $50_1$ to $50_N$. As will be described herein, client system 20 is configured according to the present invention to communicate with any of server systems $50_1$ to $50_N$, e.g., to create connections to one another, over which they can exchange streams of data.

As FIG. 1 illustrates, particular embodiments may operate in a network environment including a plurality of hosts and other distributed systems. For example, client system 20 could include a desktop personal computer, workstation, laptop, personal digital assistant (PDA), cell phone, or any WAP (Wireless Application Protocol)-enabled device or any other computing device capable of interfacing directly or indirectly to the Internet. Client system 20 typically runs a browsing program, such as Microsoft's Internal Explorer™ browser, Netscape Navigator™ browser, Mozilla Firefox™ browser, Opera™ browser, or a WAP-enabled browser in the case of a cell phone, PDA or other wireless device, or the like, allowing a user of client system 20 to access and obtain authentication from server systems $50_1$ to $50_N$ over Internet 40.

Client system 20 also typically includes one or more user interface devices, such as a keyboard, a mouse, touch screen, pen or the like, for interacting with a graphical user interface (GUI) provided by the browser on a display (e.g., monitor screen, LCD display, etc.), in conjunction with pages, login forms and other information provided by server systems $50_1$ to $50_N$ or other servers. The present invention is suitable for use with the Internet, which refers to a specific global network of networks. However, it should be understood that other networks can be used instead of or in addition to the Internet, such as an intranet, an extranet, a virtual private network (VPN), a non-TCP/IP based network, any LAN or WAN or the like.

B. Computing Client or Server Architecture

Figure 2:
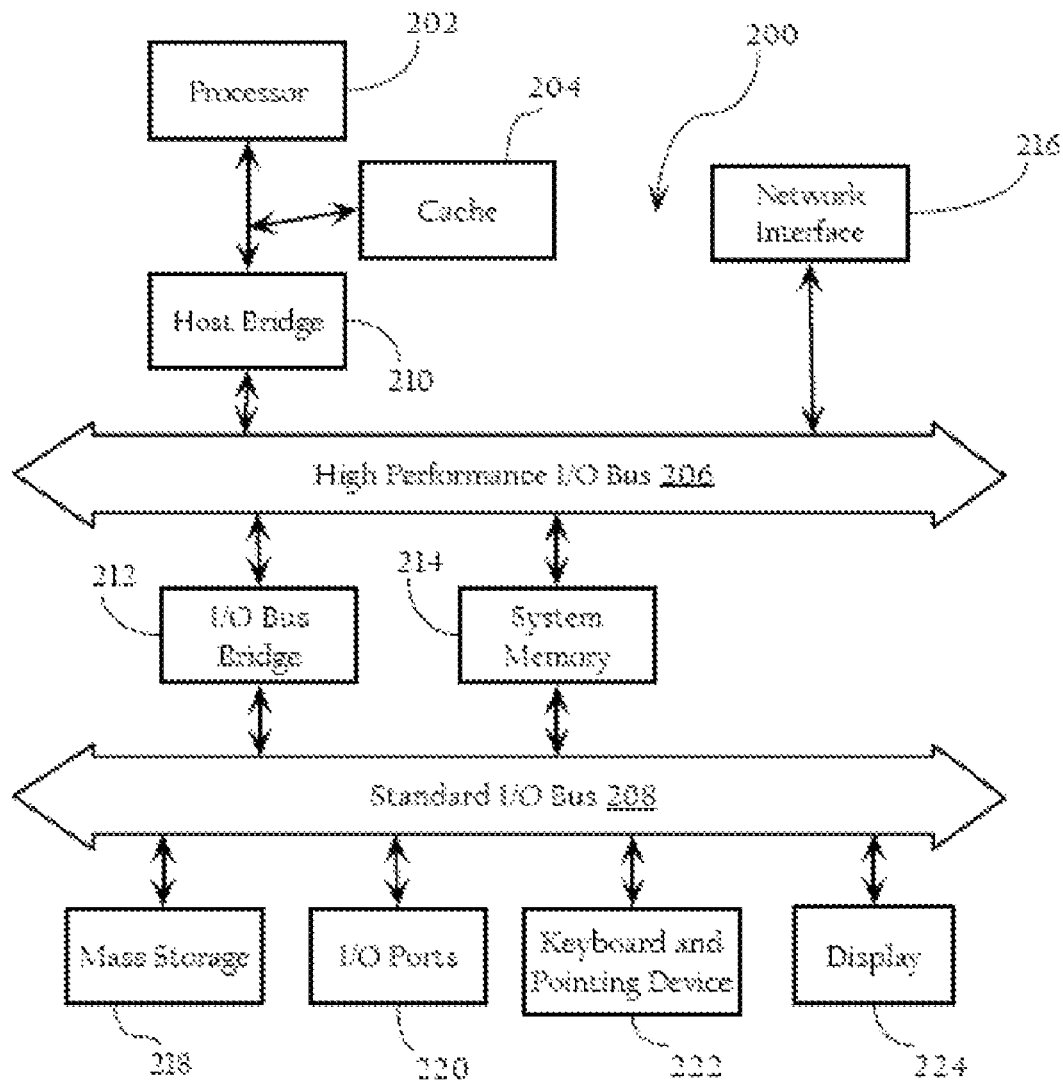
FIG. 2 is a diagram showing an example system architecture for a client system or a server, which might be used by an embodiment of the present invention.

FIG. 2 illustrates, for didactic purposes, a hardware system 200, which may be used to implement a client system or a server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In one embodiment, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In one embodiment, the process to estimate client response time described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP operating system, available from Microsoft Corporation of Redmond, Wash., the Apple Macintosh Operating System, available from Apple Computer Int. of Cupertino, Calif., UNIX operating systems, and the like.

C. Estimation of Response Time

Figure 3:
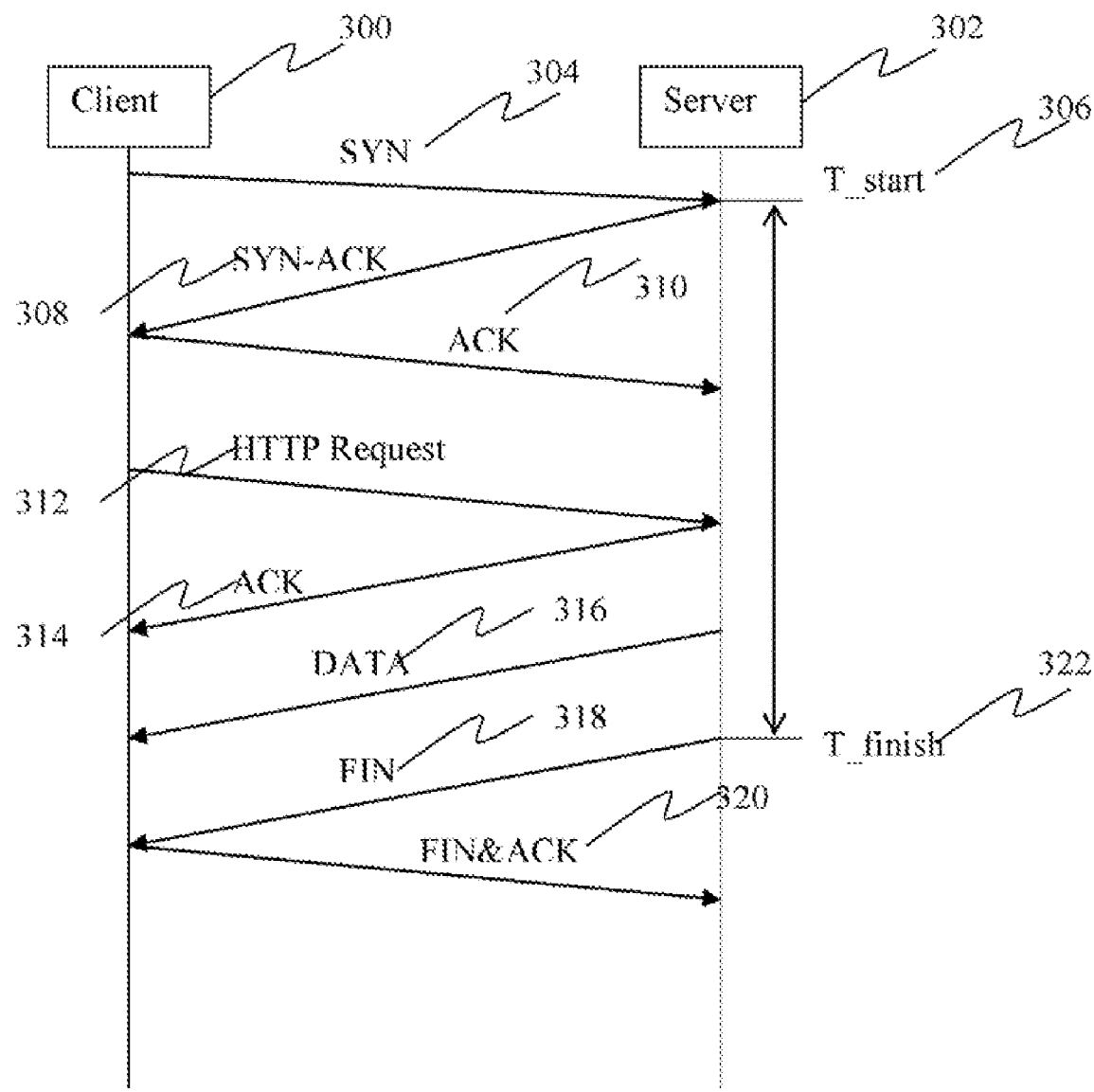
FIG. 3 is a diagram showing an example of a communication between a client system and a server.

FIG. 3 illustrates an example communication sequence between a client system 300 and a server 302, which communication sequence might be used by an embodiment of the present invention. In the embodiment, the client system 300 interacts with a server 302 over a computer network using the Transmission Control Protocol (TCP) or any other connection-oriented, reliable delivery protocol including a connection handshake and connection teardown. The client system 300 first sends a SYN packet 304 to the server 302. In response, the server 302 replies with a SYN-ACK packet 308. The client then sends an ACK packet 310 (usually called SYN-ACK-ACK) back to the server 302. This three way handshake would establish a connection between the client system and the server. The client system 300 and the server 302 then exchange data through requests 312 and responses, for example, formatted according to the HyperText Transport Protocol (HTTP). The server sends an ACK 314 to the client system 300 for received packets of data. TCP divides the byte stream into appropriately sized segments of data 316 which usually is delineated by the maximum transmission unit (MTU) size of the data link layer of a network to which the client and the server are attached. TCP assigns a sequence number to each packet to make sure that no packets are lost and that the data is delivered in the correct order. TCP sends back an acknowledgement for packets which have been successfully received. A timer at the sending TCP will cause a timeout if an acknowledgement is not received within a reasonable Round Trip Time (RTT), and the presumably lost data will be re-transmitted.

A TCP connection is terminated through a four-way handshake, with each side of the connection terminating independently. In some embodiment, when the client system 300 or the server 302 wishes to stop its half of the connection, it transmits a FIN packet, which the other end acknowledges with an ACK. Therefore, a typical teardown requires a pair of FIN and ACK segments from each TCP endpoint. A connection can be "half-open", in which case one side has terminated its end, but the other has not. The side that has terminated can no longer send any data into the connection, but the other side can.

In some embodiments, it is also possible for a 3-way handshake when the server 302 sends a FIN 318 and the client system 300 replies with a FIN & ACK 320 (merely combines 2 steps into one) and the server 302 replies with an ACK. Yet in some other embodiments, it is possible for both the client system 300 and the server 302 to send FINs simultaneously then both just have to ACK. This could possibly be considered a 2-way handshake since the FIN/ACK sequence is done in parallel for both directions.

In one embodiment, a data logging module monitoring the messages traversing the networking protocol stack of the server 302 can log selected packets in the sequence by copying them to a mass data storage device for later analysis. In large scale network systems, it is impractical to store all packets given the required volume of data. Accordingly, in one implementation, the data logging module may filter out all acknowledgment and data packets, leaving connecting handshake and teardown packets. In some embodiments, the program that implements the process uses a public domain library called PCAP to capture TCP packets. PCAP library provides an interface to capture data packets from a system's network interface as they are sent or received. The library also allows users to specify arbitrary filters to restrict the capture of packets. In some embodiments, a time stamp may be assigned to a SYN packet and a FIN packet. In this embodiment, only the connection handshake and teardown packets of TCP are captured. Therefore, it is possible to capture connections for several hours without overwhelming the system or drop any information. Given the limited data that is collected, the elapsed time between T_start 306 (which is the time stamp for the SYN 304) and T_finish 322 (which is the time stamp for the FIN 318) is the estimated response time between the client system 300 and the server 302 for the specific data communication session. Since a connection may be terminated in several different ways as previously described, the calculated response time includes a margin of error of one roundtrip time between a client system and a server. In some embodiments, this margin of error is the elapsed time between the FIN packet 318 and the FIN packet 320. The actual response time will be the difference between the time the client transmits 304 and the time the client receives 316.

Figure 4:
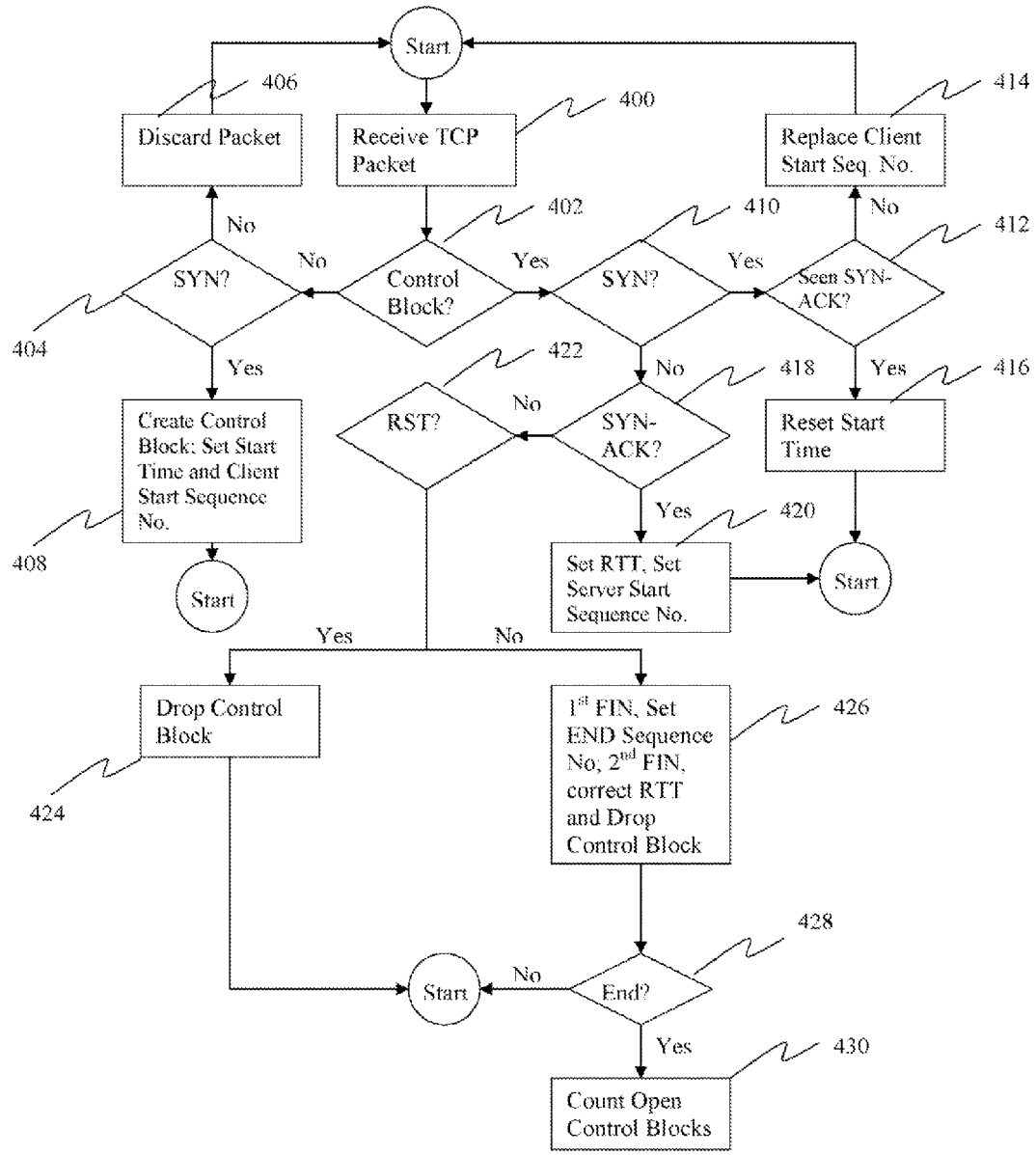
FIG. 4 is a diagram showing a flowchart of the example process used for estimation of response time.

FIG. 4 shows a flowchart of a process to estimate a response time, which process might be used by an embodiment of the present invention. In one embodiment, the process is implemented by a program on a client system or a server. The process may be applied to real time or offline based on a set of logged data from a data logging module. Since each connection is distinct, data about each connection is maintained separately. The program uses a special data structure for this purpose, called a control block. The control block contains state information about the connection. In one implementation, the program maintains state information, opening and closing control blocks, as SYNs and FINs corresponding to the connection are detected. At the end of a data stream or a period of time, the state of the open control blocks can be analyzed to compute one or more statistics. In addition, response times can be estimated based on the relative timing of select packets in a given connection.

In one embodiment, the process starts with receiving one TCP packet in step 400. In some embodiments, the process is applied in real time. A current time stamp is received with each TCP packet. In some other embodiments, the process is applied offline based on a set of logged data wherein a time stamp is logged for each TCP packet. In step 402, the program determines if there is any control block associated with the packet. In one implementation, a control block is identified relative to a tuple of attributes regarding the connection. In one implementation, the tuple can comprise source IP address, destination IP address, source port number, and/or destination port number. In one implementation, control blocks or pointers to control blocks are maintained in a hash table indexed by a hash of one or more of the foregoing attributes. In step 404, the program checks if the packet is a SYN packet. If the packet of a SYN, the program creates a new control block in step 408 and starts to process the next TCP packet in the data stream. In some embodiments, there are several data fields in a new control block that are initialized and ready to be populated. The data fields may include a time stamp for the SYN packet, a client start sequence number from the SYN packet sent by the client, a server start sequence number from the SYN packet sent by the server, a sequence number for the last byte in a FIN packet, a sequence number from the ACK number in the FIN packet, one or more counters for a response time, one or more counters for a Round Trip Time, and one or more counters for a number of bytes sent and received. If the packet is not a SYN, the program discards it in step 406 and starts to process the next TCP packet in the data stream.

If there already is a control block associated with the packet determined in step 402, the program checks if the packet is a SYN packet in step 410. If it is, the program further checks in step 412 whether it has seen a SYN-ACK for the packet based on the sequence number in the control block. If a SYN-ACK has been observed, the client start sequence number in the control block would be replaced with the sequence number in the SYN packet. If the program determines that a SYN-ACK packet has been observed for the packet, it replaces the client start sequence number with the sequence number in the SYN packet, and resets the start time T_start to the time stamp associated with the packet in step 416 and starts to process the next TCP packet in the data stream thereafter.

If the packet is not a SYN packet as determined in step 410, the program further checks if it is a SYN-ACK packet in step 418. If the packet is a SYN-ACK packet, the program computes the Round Trip Time (RTT) in step 420 by calculating the time lapse between the start time in the control block and the time stamp of the SYN-ACK packet. The computed Round Trip Time is stored in the control block. Also, the sequence number of the SYN-ACK packet is stored in the control block as the server start sequence number. If the packet is not a SYN-ACK as determined in step 418, the program checks if the packet is a RST (reset) packet. If it is, the program drops the control block in step 424 and starts to process the next TCP packet in the data stream; otherwise the program checks if the packet is a FIN packet. If the packet is a FIN packet, the program calculates the response time by determining the time lapse between the start time stamp in the control block and the time stamp of the FIN packet. If the FIN packet originated from the client, then the number of bytes sent by the client is computed as the expression SEQ Number in FIN Packet+Number of bytes in FIN Packet−start client sequence number), and the number of bytes sent by the server is computed as the expression (ACK number in FIN packet−server start sequence number). If, on the other hand, the FIN packet is sent by the server, then the number of bytes sent by the client is computed as the expression (ACK number in FIN packet−client start sequence number), and the number of bytes sent by the server is computed as the expression (SEQ number in FIN packet+number of bytes in FIN packet−server start sequence number). In one embodiment, the program computes the response time as the difference between the time stamp of the FIN packet and the start time as recorded in step 408. The program also sets the sequence number of the last byte of the FIN packet in the control block. In some embodiments, the program might observe two FIN packets depending on the connection termination sequence as previously described. For the first FIN packet, the program sets the sequence number for the last byte of the FIN packet in the control block, computes the number of bytes sent by server and client, and the response time as described above. If the sequence number for the FIN packet is already set in the control block and a second FIN packet is observed, the program adjusts the calculated round trip time by subtracting the time stamp of the second FIN packet from that of the first in step 426. After the second FIN packet is observed, the Control Block created in step 408 is dropped.

If the data stream has not ended in step 428, the program starts to process the next TCP packet in the data stream. If the data stream has ended, the program estimates the number of dropped connections in step 430. In one embodiment, the program counts the total number of open control blocks as a proxy for the number of open (ongoing) connections. In an open control block, no connection termination packets are detected. The total number of control blocks for which SYN-ACK has not been seen is the number of dropped connections.

In some embodiments, the process described in FIG. 4 may be applied to one or more logs generated by a data logging module. In one embodiment, a log may be generated by a publicly available utility such as a tcpdump. A log entry generated by tcpdump includes a source address and a port number, a destination address and a port number, one or more flags, one or more data sequence numbers, and one or more options. In other embodiments, the data logging module may use one or more filters and selectively log data packets based on the filters.

In some other embodiments, the process described in FIG. 4 may be used to compute one or more network statistics based on the recorded arrival times and the number of open control blocks at the end of the data stream. The statistics may include the distribution of the response times, the distribution of throughput, and connection attacks on a client system or a server. A connection attack may be detected when there are an unusual large number of SYN packets received by a client system or a server during a short period of time.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

What is claimed is:

1. A method comprising:
monitoring communications transmitted in a data stream, the communications comprising communications between a plurality of hosts, each communication comprising one or more Transmission Control Protocol (TCP) packets including one or more of SYN packets, FIN packets, ACK packets, and data packets;
filtering the communications to extract SYN and FIN packets;
detecting a first SYN packet transmitted from a first host to be received by a second host, the first SYN packet operative to initiate a first connection between the first host and the second host;
assigning a first SYN timestamp to the first SYN packet;
detecting a first FIN packet transmitted between the first host and the second host, the first FIN packet operative to terminate at least a first side of the first connection;
assigning a first FIN timestamp to the first FIN packet;
computing a first estimated response time between the first host and the second host, the first estimated response time being the elapsed time between the first SYN timestamp and the first FIN timestamp;
detecting a second FIN packet transmitted between the first host and the second host, the second FIN packet operative to terminate at least a second side of the first connection;
assigning a second FIN timestamp to the second FIN packet; and
adjusting the first estimated response time by the difference between the first FIN timestamp and the second FIN timestamp.

2. The method of claim 1, further comprising:
opening a control block for the first connection upon detecting the first SYN packet.

3. The method of claim 2, further comprising:
dropping the control block after detecting the first FIN packet.

4. The method of claim 1, wherein the control block comprises one or more of a start time, the first SYN timestamp, the first FIN timestamp, one or more counters for a response time, one or more counters for a Round Trip Time, two or more counters for a number of bytes, two or more sequence numbers, and one or more flags for a connection termination packet.

5. The method of claim 1, further comprising:
computing a total number of bytes transmitted between the first and second hosts.

6. The method of claim 1, further comprising:
determining a total number of dropped connections between the plurality of hosts by counting the number of open control blocks at an end of the data stream.

7. The method of claim 1, wherein the data stream comprises one or more logs, wherein a log comprises one or more entries, each entry comprising a source address and a port number, a destination address and a port number, one or more flags, one or more data sequence numbers, and one or more options.

8. The method of claim 1, wherein the monitoring, filtering, detecting the first SYN packet, assigning the first SYN timestamp, detecting the first FIN packet, assigning the first FIN timestamp, and computing the first estimated response time are performed in real time.

9. Logic encoded in one or more computer-readable non-transitory storage media for execution on a data processing system, wherein the logic when executed is operable to:
monitor communications transmitted in a data stream, the communications comprising communications between a plurality of hosts, each communication comprising one or more Transmission Control Protocol (TCP) packets including one or more of SYN packets, FIN packets, ACK packets, and data packets;
filter the communications to extract SYN and FIN packets;
detect a first SYN packet transmitted from a first host to be received by a second host, the first SYN packet operative to initiate a first connection between the first host and the second host;
assign a first SYN timestamp to the first SYN packet;
detect a first FIN packet transmitted between the first host and the second host, the first FIN packet operative to terminate at least a first side of the first connection;
assign a first FIN timestamp to the first FIN packet;
compute a first estimated response time between the first host and the second host, the first estimated response time being the elapsed time between the first SYN timestamp and the first FIN timestamp;
detect a second FIN packet transmitted between the first host and the second host, the second FIN packet operative to terminate at least a second side of the first connection;
assign a second FIN timestamp to the second FIN packet; and
adjust the first estimated response time by the difference between the first FIN timestamp and the second FIN timestamp.

10. The logic of claim 9, further operable to:
open a control block for the first connection upon detection of the first SYN packet.

11. The logic of claim 10, further operable to:
drop the control block for the first connection after detection of the first FIN packet.

12. The logic of claim 9, wherein the control block comprises one or more of a start time, the first SYN timestamp, the first FIN timestamp, one or more counters for a response time, one or more counters for a Round Trip Time, two or more counters for a number of bytes, two or more sequence numbers, and one or more flags for a connection termination packet.

13. The logic of claim 9, further operable to:
compute a total number of bytes transmitted between the first and second hosts.

14. The logic of claim 9, further operable to:
determine a total number of dropped connections between the plurality of hosts by counting the number of open control blocks at an end of the data stream.

15. The logic of claim 9, wherein the data stream comprises one or more logs, wherein a log comprises one or more entries, each entry comprising a source address and a port number, a destination address and a port number, one or more flags, one or more data sequence numbers, and one or more options.

16. The logic of claim 9, wherein the logic operable to monitor, filter, detect the first SYN packet, assign the first SYN timestamp, detect the first FIN packet, assign the first FIN timestamp, and compute the first estimated response time is operable to monitor, filter, detect the first SYN packet, assign the first SYN timestamp, detect the first FIN packet, assign the first FIN timestamp, and compute the first estimated response time in real time.

17. A method comprising:
receiving a first Transmission Control Protocol (TCP) packet;
assigning a first timestamp to the first TCP packet;
determining if the first TCP packet corresponds to an existing control block;
if the first TCP packet does not correspond to an existing control block,
determining if the first TCP packet is a SYN packet;
if the first TCP packet is a SYN packet,
creating a first control block corresponding to a first connection between a first host and a second host, the first control block comprising the first timestamp;
if the first TCP packet corresponds to an existing first control block corresponding to the first connection between the first host and the second host,
determining if the first TCP packet is a SYN packet corresponding to the first connection;
if the first TCP packet is a SYN packet corresponding to the first connection,
determining if a SYN-ACK packet has been received for the first connection;
if the SYN-ACK packet has not been received for the first connection,
replacing a client start sequence number in the first control block with a sequence number in the SYN packet;
if the SYN-ACK packet has been received for the first connection,
replacing a client start sequence number in the first control block with a sequence number in the SYN packet; and
resetting a start time in the first control block with the first timestamp;
if the first TCP packet is not a SYN packet corresponding to the first connection;
determining if the first TCP packet is a first FIN packet corresponding to the first connection;
if the first TCP packet is a first FIN packet corresponding to the first connection,
computing an estimated response time for the first connection, the estimated response time being the difference in time between the first timestamp and the start time in the first control block;
determining if the first TCP packet is a second FIN packet corresponding to the first connection;
if the first TCP packet is a second FIN packet corresponding to the first connection,
adjusting the estimated response time for the first connection by the difference between the first timestamp assigned to the first FIN packet and the first time stamp assigned to the second FIN packet.

18. The method of claim 17, further comprising:
if the first TCP packet corresponds to an existing first control block corresponding to the first connection between the first host and the second host, and if the first TCP packet is not a SYN packet corresponding to the first connection;
determining if the first TCP packet is a SYN-ACK packet;
if the first TCP packet is a SYN-ACK packet,
  computing a round trip time, the round trip time being the difference in time between a start time in the first control block and the first timestamp;

if the first TCP packet is not a SYN-ACK packet,
  determining if the first TCP packet is a reset (RST) packet;
  if the first TCP packet is an RST packet,
    dropping the first control block.

* * * * *